United States Patent
Kumar et al.

(10) Patent No.: US 11,822,470 B2
(45) Date of Patent: Nov. 21, 2023

(54) PLATFORM AGNOSTIC LIBRARY-LESS INTELLIGENT TEST AUTOMATION BY REVERSE ENGINEERING PRODUCT REST API SPECIFICATION

(71) Applicant: EMC IP HOLDING COMPANY LLC, Hopkinton, MA (US)

(72) Inventors: Sathish Kumar, Bangalore (IN); Kumaravel Palanisamy, Bangalore (IN)

(73) Assignee: Dell Products, L.P., Hopkinton, MA (US)

(*) Notice: Subject to any disclaimer, the term of this patent is extended or adjusted under 35 U.S.C. 154(b) by 0 days.

(21) Appl. No.: 17/070,987

(22) Filed: Oct. 15, 2020

(65) Prior Publication Data

US 2022/0121562 A1 Apr. 21, 2022

(51) Int. Cl.
G06F 11/36 (2006.01)
G06F 9/54 (2006.01)

(52) U.S. Cl.
CPC ............ *G06F 11/3696* (2013.01); *G06F 9/54* (2013.01); *G06F 11/3684* (2013.01)

(58) Field of Classification Search
CPC ..... G06F 11/3696; G06F 11/3684; G06F 9/54
See application file for complete search history.

(56) References Cited

U.S. PATENT DOCUMENTS

| | | | | |
|---|---|---|---|---|
| 9,959,198 | B1* | 5/2018 | Jha | G06F 11/3684 |
| 10,540,270 | B1* | 1/2020 | Surkatty | G06F 11/3688 |
| 11,321,219 | B2* | 5/2022 | Godefroid | G06F 11/362 |
| 2014/0068340 | A1* | 3/2014 | Dayal | H04L 41/5096 |
| | | | | 714/38.1 |
| 2014/0075242 | A1* | 3/2014 | Dolinina | G06F 11/3672 |
| | | | | 714/E11.178 |
| 2015/0095923 | A1* | 4/2015 | Sarid | G06F 8/30 |
| | | | | 719/328 |
| 2016/0147578 | A1* | 5/2016 | Biesack | G06F 9/541 |
| | | | | 719/328 |
| 2017/0052884 | A1* | 2/2017 | Ganda | G06F 11/3688 |
| 2018/0314622 | A1* | 11/2018 | Lowe | G06F 11/3616 |
| 2019/0370152 | A1* | 12/2019 | Godefroid | G06F 11/3664 |
| 2021/0373860 | A1* | 12/2021 | Khan | G06F 8/41 |
| 2022/0050584 | A1* | 2/2022 | Dines | G06F 8/34 |

* cited by examiner

*Primary Examiner* — Wei Y Zhen
*Assistant Examiner* — Brahim Bourzik
(74) *Attorney, Agent, or Firm* — Anderson Gorecki LLP

(57) ABSTRACT

An API reader reads a system application's API specification file and creates a root.yml file containing key:value pairs, in which the keys are objects, and the values are staging_object.yml files. Each staging_object.yml file includes a set of entries, with each entry including a REST operation, a REST endpoint, and a description of the operation to be performed using that entry. An intelligent API converter creates structured object.yml files based on corresponding unstructured staging_object.yml files, and replaces the staging_object.yml files of the root.yml file with the newly created object.yml files. Each object.yml file includes a plurality of entries, corresponding to the entries of the respective staging_object.yml file. Each entry of the object.yml file includes an OPERATION, a JSON payload, and a VALIDATION section. An API builder uses the root.yml file to build a REST API for the system under test which is used to automate testing of the application.

14 Claims, 16 Drawing Sheets

FIG. 4

Example root.yml file 320

```
Key:Value
#objects:staging_object.yml
    node:staging_node.yml
    nas_server:staging_nas_server.yml
    file_system:staging_file_system.yml
    nfs_server:staging_nfs_server.yml
    snapshot:staging_snapshot.yml
    snap_schedule:staging_snap_schedule.yml
    tree_quota:staging_tree_quota.yml
    user_quota:staging_user_quota.yml
    nfs_export:staging_nfs_export.yml
    smb_server:staging_smb_server.yml
    smb_share:staging_smb_share.yml
```

FIG. 5

Snippet of an example staging_object.yml file

| Method 400 | URI 405 | Description 410 |
|---|---|---|
| Post | /types/nasServer/instances | List all NAS Server instances on the system |
| Post | /types/nasServer/instances | Creates a new NAS Server on the system  420 |
| Get | /instances/nasServer/{id} | Query a NAS Server settings |
| Delete | /instances/nasServer/{id} | Delete a NAS Server |
| Post | /instances/nasServer/{id}/action/modify | Modify settings of a NAS Server |
| Post | /instances/nasServer/{id}/action/svccmd | Service script |
| Post | /instances/nasServer/{id}/updateUserMapping | Fix the user mappings for all file systems associated with the NAS server |
| Post | /instances/nasServer/{id}/action/refreshCache | Refresh NAS Server components in SQL cache DB |
| Post | /instances/nasServer/{id}/action/refreshQuota | Refresh filesystem quota in SQL cache DB |
| Post | /instances/nasServer/{id}/action/ping | Ping Destination from NAS Server |
| Post | /instances/nasServer/{id}/action/setPrimaryNode | Set Primary Node |
| Post | /instances/nasServer/{id}setBackupNode | Set Backup Node |

FIG. 6

Example snippet of nas_server create operation payload

| nasServer | Information about the NAS server on the storage system | ⌄ |
|---|---|---|

| Post | /types/nasServer/instances | Creates a new NAS Server on the system |
|---|---|---|

Create a NAS Server

| Parameters | | Try it out |
|---|---|---|

| Name | Description |
|---|---|
| nasServerCreateArguments object (body) | description of the NAS server to create<br><br>Example Value \| Model<br><br>Argument for the NAS Server create operation⌄ {<br>  description:     Argument for the NAS Server create operation<br><br>  name*     string<br>     title: *NAS Server name*<br>     *minlength*: 1<br>     *maxlength*: 255<br><br>     name of the NAS Server<br><br>  primaryNode     string<br>     title: *primary node*<br><br>     Identifier of the primary node where the NAS server was created<br><br>  backupNode     string<br>     title: *backup node*<br><br>     Identifier of the backup node for the NAS Server |

FIG. 7

Example snippet of Response to nas_server create operation payload

| Resonses | | Response content type | Application/json |
|---|---|---|---|
| Code | Description | | |
| 201 | Object Created<br>Example Value \| Model<br>{<br>  Id*    string<br>        Unique id of the new object created.<br>  messages<br>        > [ . . ]<br>} | | |
| 202 | Job Created<br>Example Value \| Model<br>{<br>  JobId*   string<br>        Unique id of the created job<br>} | | |
| default | Error Response<br>Example Value \| Model<br>{<br>  error<br>        > { . . }<br>} | | |

FIG. 8 example object.yml file

```
operations:
    create: [post, /nas_server]

jsons:
    create: <JSON Payload> validation:
    create:
        {
            "response" : "200",
            "operation" : "nas_server, list",
            "verify" : "id"
        }
```

FIG. 10

Snippet of "nas_server" entry of object.yml file

```
OPERATION:
create: [post, /nas_server]
Note:OPERATION name as a key, REST method, and REST URI as a value JSON Payload:
jsons:
    create:
        {
            "name" : "str_UNIQUE_255",
            "primaryNode" :
            {
                "AUTOFILL" : "TRUE"
                "object" : "node",
                "operation" : "list",
                "output" : "id"
            }
            "backupNode" :
            {
                "AUTOFILL" : "TRUE"
                "object" : "node",
                "operation" : "list",
                "output" : "id"
            }
        }

VALIDATION:
validation:
    create:
        {
            "response" : "200",
            "operation" : "nas_server, list",
            "verify" : "id",
        }
```

- 1000: OPERATION section
- 1010: JSON Payload section
- 1020: VALIDATION section

FIG. 11

Code snippet for Swagger API Reader (API Spec -> root.yml, staging_object.yml):

```
def SpecFileReader(spec = "Confluence_Page.link", format = "Swagger|PDF|WORD|POWERAPI"):

if format is "Swagger":
        with open(spec) as fd:
            lines = fd.readlines()

if page_link is root:
            create_file(root.yml)

elif page_link is object_name:
            dict = lines_into_dict(lines)
            create_file(staging_object.yml)

else:
            return [root.yml, staging_object1.yml, ... staging_objectN.yml]
```

FIG. 12

Snippet of code used by API Converter to create object.yml

```
yml = yaml.safe_load("root.yml")
objects = dict(yml.get('objects'))
product = {} # Dict declaration
for object in objects.keys():
    staging_yml_filename = objects[object]
    obj_api_defn = yaml.safe_load(open(staging_yml_filename))
    product[object] = obj_api_defn
    fd = createFile(object.yml)
    for line in staging_yml_filename:
        if line has "*":
            fd.write(add_UNIQUE_TAG(parameter))
        elif line has "id*":
            fd.write(add_AUTOFILL_TAG(parameter))
        else:
            fd.write(add(parameter))
```

FIG. 13

Snippet of code from Intelligent API Builder

```
def RestAPI_PayLoad_Builder(self, object=None, operation=None, customPayLoad=None):

if object not in self.file.keys():
        self.log.error("Invalid object definition: " + object)
        return None if operation not in self.file[object]['operations'].keys():
        self.log.error("Invalid operation definition: " + operation)
        return None uri = self.file[object]['operations'][operation]
    val = self.file[object]['validation'][operation]
    payLoad = self.file[object]['jsons'][operation]

uri = self.root + uri[1]
    action = uri[0] #POST, GET, DELETE
    if 'UNIQUE' in str(payLoad[key]):
        now = time.time()
        now = math.ceil(now)
        payLoad[key].replace("UNIQUE", str(now))
    elif 'AUTOFILL' in str(payLoad[key]):
        autofill_val = doREST(payLoad[key]['object'], payLoad[key]['operation'])
        payLoad[key]['id'] = autofill_val rest_call_set = (action, uri, payLoad)
```

FIG. 14

Code Snippet (Execution)

```
def post(self, uri = None, json = None, head = header):
    response = requests.post(url=uri, data=json, headers=head, verify=False)
    return (response.status_code, response.text)

def get(self,uri = None):
    response = requests.get(uri, verify=False)
    return (response.status_code,response.text)

def delete(self, uri = None):
    response = requests.delete(uri, verify=False)
    return (response.status_code, response.text)
```

FIG. 15

Code Snippet (Validation)

```
def validate(self, spec_validate=None, return_code=None, return_text=None):
    """
    First level of validation:
    checks the response code received from specific REST call against expected response code
    if True:
        Expected :204 Received: 204
    if False:
        Expected :200 Received: 400
    Second level of validation:
        Here we are checking for "id" for 'create' operation, "modified value" for 'update' operation and "id" not to
    be found for 'delete' operation.
        Below code parses the 'operation' part provided by the user for validation, available at .yml file
    """
```

FIG. 16

Example Test Case Script

```
#Test case: Filesystem Test
from lib.PowerMaxFile.JSONBuilder1 import JBuilder as pf step1 - create nas_server server_name=kumar_test236
JSON = {'name': 'kumar_test236'}
pf.ResAPI_PayLoad_Builder(object="nas_server", operation="create",
customPayLoad=JSON)

#step2 - create file_interface ip=10.228.207.142 on nas_server
server_name=kumar_test236
JSON = {'nasServer': 'kumar_test236', 'ipAddress': '10.228.207.142'} pf.ResAPI_PayLoad_Builder(object="file_interface", operation="create",
customPayLoad=JSON)

#step3 - create file_system filesystem_name=file1_test236 size=100000 on
nas_server server_name=kumar_test236
JSON = {'name': 'file1_test236', 'sizeTotal': 100000, 'nasServer': 'kumar_test236'}
pf.ResAPI_PayLoad_Builder(object="file_system", operation="create",
customPayLoad=JSON)

#step4 - modify filesystem filesystem_name=file1_test236 with size=10000
JSON = {'name': 'file1_test236', 'sizeTotal': 10000}
pf.ResAPI_PayLoad_Builder(object="file_system", operation="modify",
customPayLoad=JSON)

#step5 - modify filesystem filesystem_name=file1_test236 with size=90000
JSON = {'name': 'file1_test236', 'sizeTotal': 90000}
pf.ResAPI_PayLoad_Builder(object="file_system", operation="modify",
customPayLoad=JSON)

#step6 - modify filesystem filesystem_name=file1_test236 with size=100000
JSON = {'name': 'file1_test236', 'sizeTotal': 100000}
pf.ResAPI_PayLoad_Builder(object="file_system", operation="modify",
customPayLoad=JSON)
```

PLATFORM AGNOSTIC LIBRARY-LESS INTELLIGENT TEST AUTOMATION BY REVERSE ENGINEERING PRODUCT REST API SPECIFICATION

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

FIELD

This disclosure relates to computing systems and related devices and methods, and, more particularly, to a method and apparatus for platform agnostic library-less intelligent test automation by reverse engineering a product's REST API specification.

BACKGROUND

When a system application for a storage system is created or modified, it is necessary to test the functionality of the system application to ensure that it operates as intended. Conventionally, implementing this type of testing required development of test automation libraries/modules to enable all of the product functionalities (REST APIs) to be tested using a test case automation process.

These test automation libraries needed to be created before test case automation could be implemented. Unfortunately, these libraries are created for a particular product, and are tightly coupled to that particular product. This makes it impractical to leverage automation libraries across platforms. Further, because a product's REST APIs often change during the development process, often the test automation libraries are not created until later in the product development cycle, for example after the REST API has stabilized. The alternative is to rebuild the test automation libraries several times during the development process, which increases the overall cost of developing the product and makes it more difficult to implement test driven development. Further, the automated test scripts often cannot be shared with the customer for acceptance tests before a new storage system is put into service, since the automation scripts depend heavily on the automation libraries. Accordingly, customers have to run the tests manually or they have to develop their own automation test scripts, which in turn takes time and resources.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A test automation application includes an API reader configured to read a system application's API specification file, which may be for example a Word document or written using an API development tool such as Swagger. The system application is also referred to herein as the "system under test". The API reader creates a root.yml file containing key:value pairs, in which the keys are objects, and the values are staging_object.yml files. Each staging_object.yml file includes a set of entries, with each entry including a REST operation, a REST endpoint, and a description of the operation to be performed using that entry.

The test automation application includes an intelligent API converter which creates structured object.yml files based on corresponding unstructured staging_object.yml files, and replaces the staging_object.yml files of the root.yml file with the newly created object.yml files. Each object.yml file includes a plurality of entries, corresponding to the entries of the respective staging_object.yml file. Each entry of the object.yml file includes an OPERATION value which is based on the REST operation of the corresponding entry of the staging_object.yml file, a JSON payload, and a VALIDATION section indicating the type of verification operation that should be used to determine that an operation associated with the entry completed successfully on the system under test.

The test automation application includes an intelligent API builder that uses the root.yml file to build a REST API for the system under test. The test automation application includes an API execution and validation component, that issues operations on the REST API for the system under test, and compares the responses from the system under test against expected values as specified in the VALIDATION section of the respective object.yml entry that was used to generate the operation on the REST API. In this manner, test automation can be implemented without requiring the creation of test automation libraries.

BRIEF DESCRIPTION OF THE DRAWINGS

FIG. 4 is an example snippet of a root.yml file, according to some embodiments.

FIG. 5 is a snippet of an example staging_object.yml file, according to some embodiments.

FIG. 6 is a snippet of an example entry of the staging_object.yml file of FIG. 5, showing a nas_server_create operation payload, according to some embodiments.

FIG. 7 is a snippet of an example expected response if the nas_server_create operation were to be executed on a system under test, according to some embodiments.

FIG. 8 is a snippet of an example object.yml file, according to some embodiments.

FIG. 10 is a snippet of an object.yml entry showing the content of object.yml for a nas_server entry, according to some embodiments.

FIG. 11 is a code snippet used by the API reader to read a Swagger API specification and generate a corresponding root.yml file containing staging_object.yml, according to some embodiments.

FIG. 12 is a code snippet used by the intelligent API converter to create object.yml from staging_object.yml, according to some embodiments.

FIG. 13 is a code snippet used by the intelligent API builder to create a REST API from the root.yml, according to some embodiments.

FIG. 14 is a code snippet used by the API execution portion of the API execution and validation module, in connection with executing operations against the REST API created by the intelligent API builder, according to some embodiments.

FIG. 15 is a code snippet used by the API validation portion of the API execution and validation module, in connection with validating the results from the system under test, according to some embodiments.

FIG. 16 is an example test case script, according to some embodiments.

DETAILED DESCRIPTION

Aspects of the inventive concepts will be described as being implemented in connection with a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, computer instructions that are stored on a non-transitory tangible computer-readable medium and implemented by multi-purpose tangible processors, and any combinations thereof.

Figure 1:
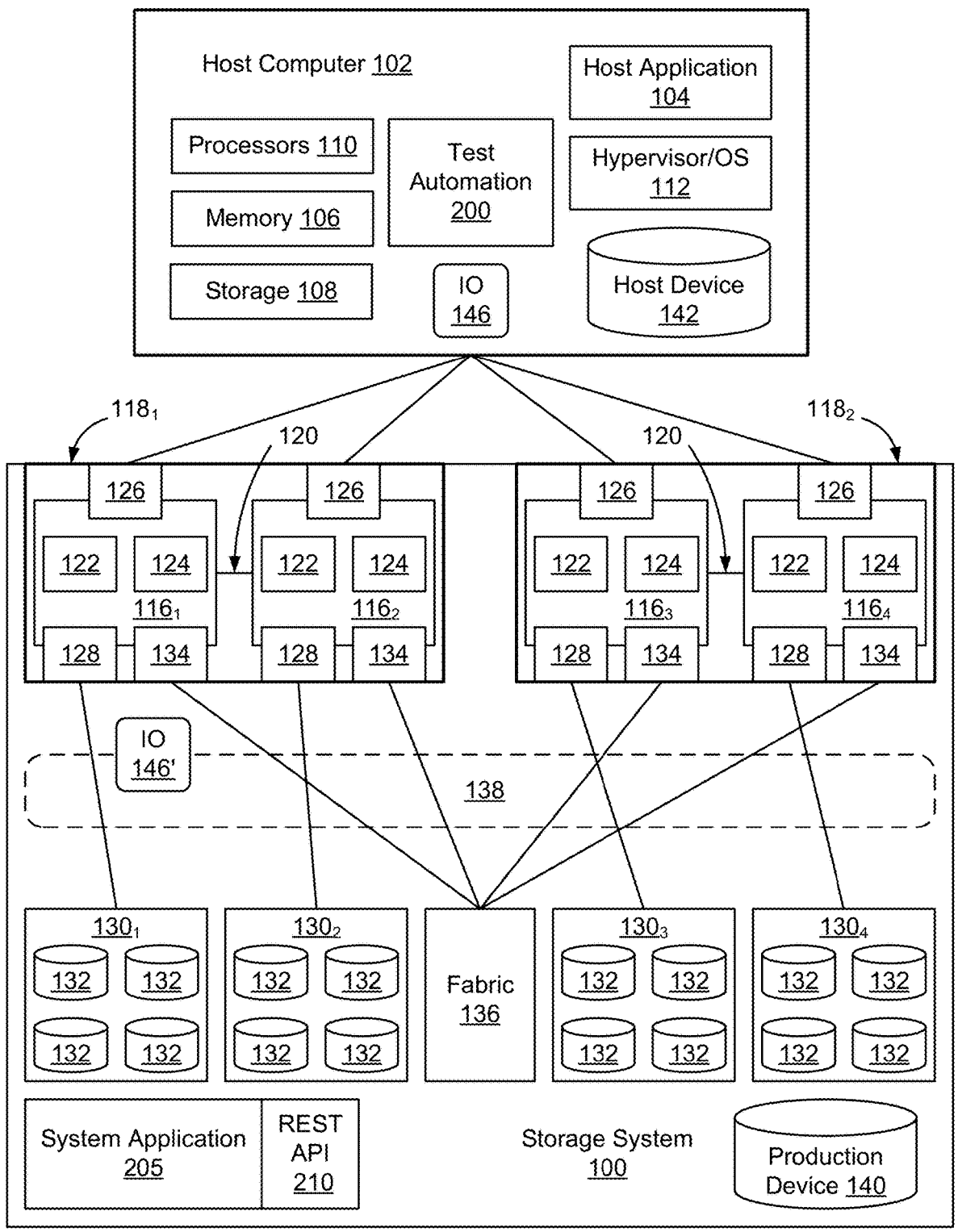
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example the host computer 102 is a server with volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers, and although an external host computer 102 is illustrated, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine is implemented using a single physical enclosure and provides a logical separation between itself and other storage engines 118 of the storage system 100. A given storage system 100 may include one or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$ using a PCIe bus, or may be connected to the compute nodes $116_1$-$116_4$, for example, by an IB (InfiniBand) bus or fabric.

In some embodiments, each compute node 116 also includes one or more CAs (Channel Adapters) 134 for communicating with other compute nodes 116 directly or via an interconnecting fabric 136. An example interconnecting fabric may be implemented using InfiniBand.

Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access).

The storage system 100 maintains data for the host applications 104 running on the host computer 102. For example, host application 104 may write host application data to the storage system 100 and read host application data from the storage system 100 in order to perform various functions. Examples of host applications 104 may include but are not limited to file servers, email servers, block servers, and databases.

Logical storage devices are created and presented to the host application 104 for storage of the host application data. For example, a production device 140 and a corresponding host device 142 are created to enable the storage system 100 to provide storage services to the host application 104. The host device 142 is a local (to host computer 102) representation of the production device 140. Multiple host devices 142 associated with different host computers 102 may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses on various different managed drives 132 on storage system 100.

In some embodiments, the storage system 100 maintains metadata that indicates, among various things, mappings between the production device 140 and the locations of extents of host application data in the shared global memory 138 and the managed drives 132. In response to an IO (Input/Output command) 146 from the host application 104 to the host device 142, the hypervisor/OS 112 determines whether the IO 146 can be serviced by accessing the host computer memory 106. If that is not possible then the IO 146 is sent to one of the compute nodes 116 to be serviced by the storage system 100.

There may be multiple paths between the host computer 102 and the storage system 100, e.g. one path per front-end adapter 126. The paths may be selected based on a wide variety of techniques and algorithms including, for context and without limitation, performance and load balancing. In the case where IO 146 is a read command, the storage system 100 uses metadata to locate the commanded data, e.g. in the shared global memory 138 or on managed drives 132. If the commanded data is not in the shared global memory 138, then the data is temporarily copied into the shared global memory from the managed drives 132 and sent to the host application 104 via one of the compute nodes $116_1$-$116_4$. In the case where the IO 146 is a write command, in some embodiments the storage system 100 copies a block being written into the shared global memory 138, marks the data as dirty, and creates new metadata that maps the address of the data on the production device 140 to a location to which the block is written on the managed drives 132. The shared global memory 138 may enable the production device 140 to be reachable via all of the compute nodes $116_1$-$116_4$ and paths, although the storage system 100 can be configured to limit use of certain paths to certain production devices 140.

As shown in FIG. 1, system applications 205 can be created to execute in the context of the storage system 100. An example system application 205 might be an application configured to enable Network Attached Storage (NAS) instances to be created, managed, and deleted on the storage system. Multiple types of system applications may execute on the storage system. In some embodiments, each system application 205 has a REST API 210 that is used by an entity, such as a storage system management application, to instruct the system application to take particular actions on the storage system. An example action may be, for example, to instruct the system application 205 to create, modify, or delete a NAS (Network Attached Storage) server instance on the storage system. Many operations can be implemented, depending on the particular functionality of the system application 205. The common set of REST operations (html methods) includes GET, HEAD, POST, PUT, PATCH, DELETE, CONNECT, and OPTIONS, although the more commonly used operations typically supported on a given REST API might include POST (create), GET (read), PUT (update), and DELETE (delete).

When a system application 205 is deployed, or as it is being developed, a test automation application 200 runs tests on the system application 205 to ensure that the system application is executing properly, and to detect operations that the system application is supposed to implement, but that are not executing properly. To do this, the test automation application issues REST operations on the system applications REST API to instruct the system application to take particular actions on the storage system 100. Although the test automation application 200 is shown as implemented on host 102, the test execution application can be implemented as a system application in an emulation on storage system 100.

To thoroughly test the system application, the test automation system 200 implements a series of operations designed to test each function of the system application 205, to ensure that the system application functions as intended. Since each system application can be designed to implement a different set of functions, the test automation application 200 needs to use a different test automation script for each system application. Likewise, if the system application is changed, the test automation script will need to change to enable the new functionality of the system application to be tested.

Conventionally, the process of implementing test automating required a resource intensive process of creating libraries that the test automation system 200 would use to test the functionality of the system application. As discussed in greater detail herein, in some embodiments a test automation application 200 is configured to reverse-engineer the REST API 210 of the system application 205, and automatically create test scripts from the REST API specification, without requiring the manual creation of test automation libraries. By reverse engineering the REST API, and using that to generate the set of test scripts, it is possible to greatly reduce the amount of effort required to implement the test automation process. Since the process of generating the test automation scripts is automated, and does not require the resource intensive process of creating libraries, it is possible to create test automation scripts at various points during the development process, to thereby enable test-drive development of system applications 205. Further, because the test automation scripts are based on the system application's REST API specification, the test automation is able to be extended between platforms.

Figure 2:
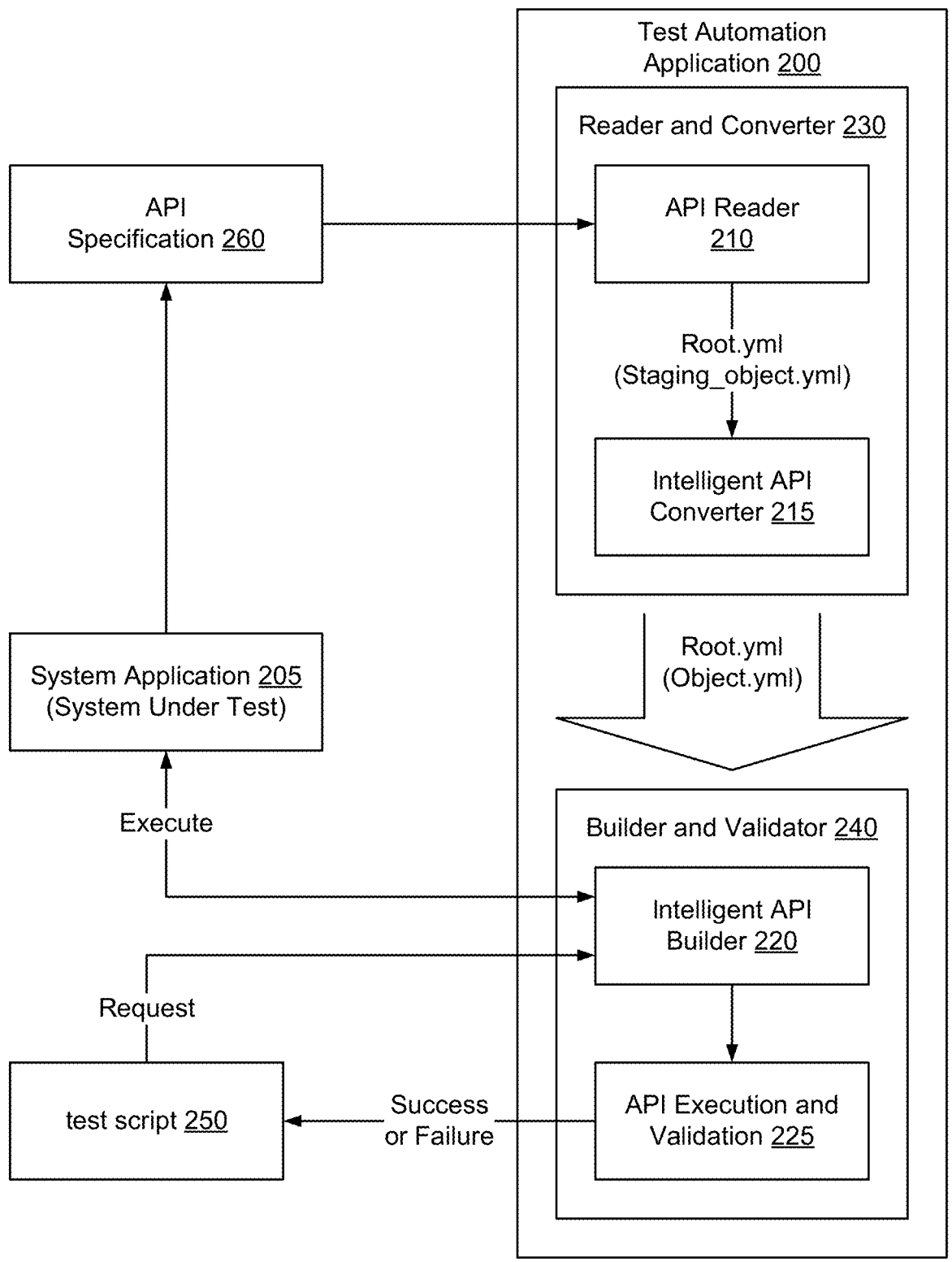
FIG. 2 is a functional block diagram of a test automation application connected to a system application 205, according to some embodiments.

FIG. 2 is a functional block diagram of a test automation application 200 connected to a system application 205 (system under test), according to some embodiments. As shown in FIG. 2, in some embodiments the test automation application 200 includes an API specification reader and converter module 230 and a builder and validator module 240. The reader and converter module 230 includes an API reader 210 configured to read a system application's API specification file 260, which may be for example a Word document or written using an API development tool such as Swagger. The API reader 210 creates a root.yml file 320 (see FIG. 3) containing key:value pairs, in which the keys are objects, and the values are staging_object.yml files. Each staging_object.yml file includes a set of entries, with each entry including a REST operation, a REST endpoint, and a description of the operation to be performed using that entry.

The reader and converter module 230 of the test automation application 200 also includes an intelligent API converter 215 which creates structured object.yml files based on corresponding unstructured staging_object.yml files, and replaces the staging_object.yml files of the root.yml file 320 with the newly created object.yml files. Each object.yml file includes a plurality of entries, corresponding to the entries of the respective staging_object.yml file. Each entry of the object.yml file includes an OPERATION value which is based on the REST operation of the corresponding entry in the staging_object.yml file, a JSON payload, and a VALIDATION section indicating the type of verification operation that should be used to determine that an operation associated with the entry completed successfully on the system under test.

In some embodiments, the builder and validator module 240 of the test automation application 200 includes an intelligent API builder 220 that uses the root.yml file to build a REST API for the system under test. The builder and validator module 240 of the test automation application 200 also includes an API execution and validation module 225. The API execution portion of the API execution and validation module 225 issues operations on the REST API for the system under test. The validation portion of the API execution and validation module 225 compares the responses from the system under test against expected values, as specified in the VALIDATION section of the respective object.yml entry that was used to generate the operation on the REST API. In this manner, test automation can be implemented without requiring the creation of test automation libraries. Each of the components of the test automation application 200 is discussed in greater detail below.

API Reader

Any product automation library involves developing the code for Create, Update, Remove and List (CURL) REST operations that must be implemented in the form of classes and functions (a.k.a. modules/libraries).

To automate different product operations by leveraging REST specifications, the proposed system needs to understand all the supported objects of the system under test. Then it scans through every object's REST end points, supported payload, and validation, and converts them into a suitable data structure, which will be used to build the REST details dynamically based on the operations.

Figure 3:
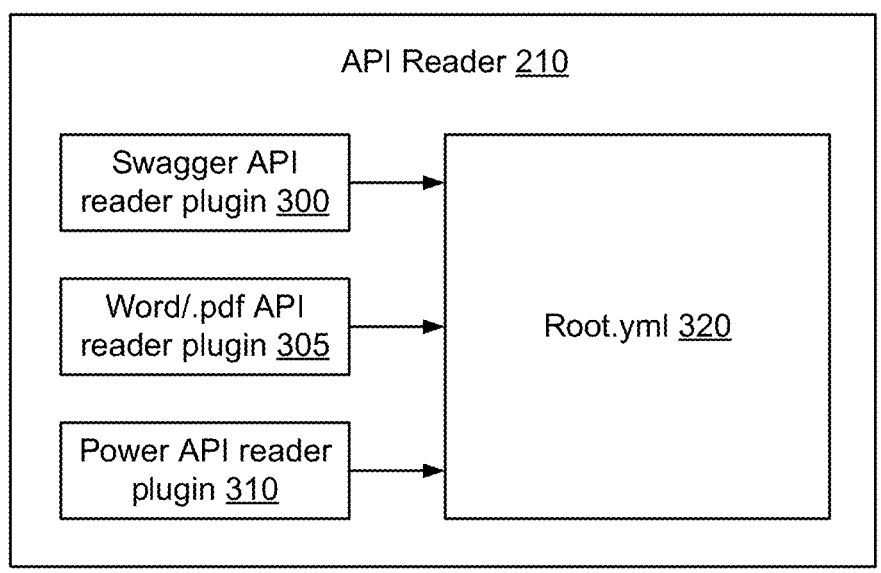
FIG. 3 is a functional block diagram of an example API reader, according to some embodiments.

FIG. 3 shows an example API reader 210. An application's REST API specification can be written in any format, such as in Word/.pdf, swagger, Power API, Confluence, etc. In some embodiments, the API reader 210 includes plugins 300, 305, 310, for the relevant specification formats, which enables the API reader 210 to read the REST API specification 260 of the system application 205 regardless of the format of the REST API specification 260. For example, as shown in FIG. 3, the API reader 210 may include a swagger API specification reader plugin 300, a Word/.pdf API specification reader plugin 305, a Power API specification reader plugin 310, and any number of other API specification reader plugins. The particular collection of API specification reader plugins may depend on the embodiment. In the following discussion, an example is described in which the REST API specification 260 of the system application 205 is assumed to be written using Swagger. If the REST API specification 260 of the system application 205 was written using another authoring tool, the corresponding API specification reader plugin would be used by the API reader 210 instead of the Swagger API specification reader plugin.

API Reader (Swagger API→Staging Object.yml)

The API reader 210 creates a yaml file referred to herein as root.yml which acts as a starting address for this system to work. YAML is a human-readable data-serialization language that is commonly used for configuration files and in applications where data is being stored or transmitted.

FIG. 4 shows an example root.yml file. As shown in FIG. 4, in some embodiments the root.yml file is implemented as a flat data structure having a set of key:value pairs. The key of each entry is the object, and the value initially is a staging_object.yml file created by the API reader 210 for the respective object. The flat content in the staging_object.yml needs to be converted into specific structure, in terms of operation(REST End Point), payload(inputs in the form of JSON) and validation details. In some embodiments, this is done by the API converter module 215, as discussed in greater detail below.

The API reader 210 reads the API specification 260 of the system under test and creates a root.yml 320 file including a set of key/value pairs, in which the key is the object and the initial value is a staging_object.yml. The staging_object.yml, in some embodiments, includes the operations, REST end point, and other data, as an unstructure type, similar to the API specification 260. As the API reader 210 reads the REST API specification 260, it builds the root.yml file by creating the key (object name):value (staging_object.yml) pairs based on the REST API specification 260.

FIG. 5 shows an example snippet of a staging_object.yml file that is related to Network Attached Storage (NAS) server operations. The example shown in FIG. 5 is based on an example REST API specification 260. The staging_object.yml file is a flat file in which each entry includes a REST operation (REST method) 400, a REST endpoint 405, and a description 410. The description 410 is used, as discussed below, in connection with determining the type of validation that should be used by the API execution and validation module 225. The staging_object.yml file is stored along with the object in the root.yml. Accordingly, any object and its value can be easily accessed by reading root.yml.

FIG. 6 is a snippet of an example entry of the staging_object.yml file of FIG. 5, showing a nas_server_create operation payload, according to some embodiments. The nas_server_create entry is the second line 420 of the snippet of the staging_object.yml file shown in FIG. 5. FIG. 7 is a snippet of an example expected response if the nas_server_create operation were to be executed on a system under test, according to some embodiments. Both snippets (FIGS. 6 and 7) are included in an entry 420 of the staging_object.yml.

Intelligent API Converter
(Staging_Object.Yml→Object.Yml)

After staging_object.yml has been created for an object, the intelligent API converter 215 transforms the staging_object.yml files into object.yml files. In some embodiments, the API reader 210 creates all of the staging_object.yml files for each of the objects of the root.yml file prior to conversion of the staging_object.yml files into object.yml files. In other embodiments, the intelligent API converter 215 can begin work on a given staging_object.yml file once the staging_object.yml file has been completed for a particular object, but before all of the staging_object.yml files have been built for all of the objects of the root.yml file.

The intelligent API converter 215 takes each staging_object.yml file and creates a corresponding object.yml file. Once the object.yml file has been created, the staging_object.yml file of the root.yml file is replaced with the newly created object.yml file.

FIG. 8 shows an example object.yml entry that is created by the intelligent API converter 215. As shown in FIG. 8, in some embodiments the object.yml file specifies the OPERATION, JSON (JavaScript Object Notation) payload, and VALIDATION parameters of each function.

As noted above, each staging_object.yml file has multiple entries. When creating the object.yml file, a corresponding entry including OPERATION, JSON Payload, and VALIDATION parameters will be created in the object.yml file for each of the entries of the staging_object.yml. The OPERATIONS section of each entry contains the operation name, it's REST method and corresponding URI. The JSON payload section contains the payload details of the particular operation. The VALIDATION section contains how validation needs to be performed for the particular operation. JSON (JavaScript Object Notation) is an open standard file format, and data interchange format, that uses human-readable text to store and transmit data objects consisting of attribute-value pairs and array data type. The VALIDATION section specifies what operations need to be performed, and what values need to be compared.

In some embodiments, the API convertor 215 builds each of these sections (OPERATIONS, JSON payloads (JSONS), VALIDATION) to create the object.yml entry as described in greater detail below.

Building the OPERATIONS Aspect of Object.Yml

In some embodiments, the API converter 215 constructs the OPERATIONS portion of the object.yml file by reading each entry of the staging_object.yml and using the REST method and additional keywords to classify the entry and create an associated OPERATION. The OPERATION thus corresponds with the associated method of the corresponding entry in the staging_object.yml. For example, in some embodiments, the API converter 215 looks for the following combinations in the staging_object.yml:

a URI with Instances keyword with GET method→OPERATION=list
a URI with Instances keyword with POST method→OPERATION=create
a URI with instances keyword and DELETE method→OPERATION=delete
URIs with action keyword with POST and {id} will be considered to be special, as some additional processing needs to be done to build the OPERATION value.

Figure 9:
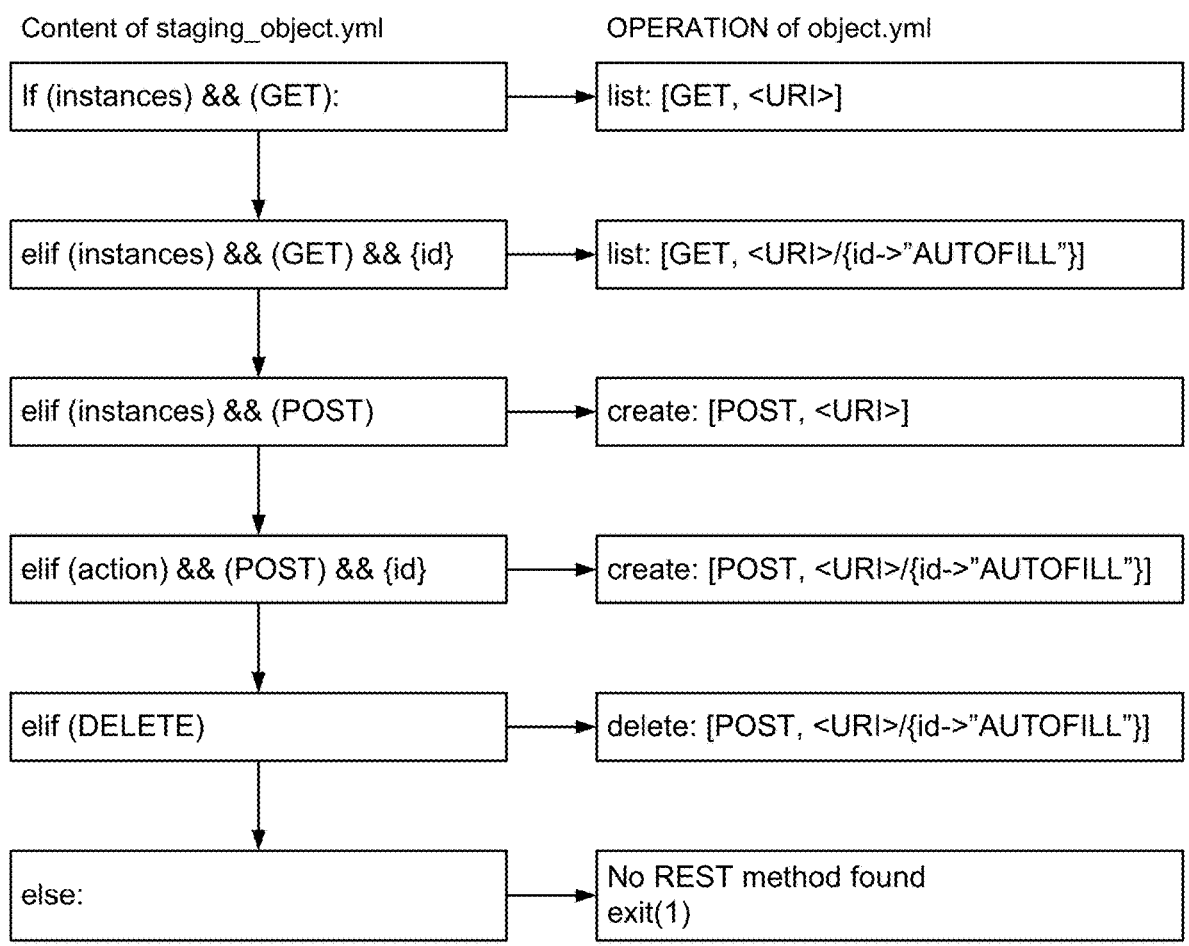
FIG. 9 is a functional block diagram showing example logic used to create an OPERATION value of an object.yml entry from the content of a corresponding entry in staging_object.yml, according to some embodiments.

FIG. 9 shows example logic that the API converter uses to build the OPERATIONS dictionary keyword and its value, according to some embodiments. As the staging_object.yml is read, the content of the staging_object.yml entry is compared using the logic on the left-hand side of FIG. 9. If the content of the staging_object.yml entry matches one of the logic entries on the left, the corresponding operation on the right-hand side of FIG. 9 is assigned to the entry in the object.yml file.

For example, as shown in the top line of FIG. 9, if the staging_object.yml entry includes (instances) paired with the REST method (GET), the OPERATION of the corresponding entry of object.yml is set to "list: [GET, <URI>]. Based on this logic, operation(keyword):([REST Method, <URI>) a dictionary for each entry of staging_object.yml is built and added under OPERATIONS key in the object.yml file.

Table I shows an example snippit of example OPERATIONS of a nas_server content, from an example nas_server.yml (object.yml file).

TABLE I operations:
create: [post, /nas_server]
delete: [delete, /nas_server]
list: [get, /nas_server]
update: [put, /nas_server]

Building the JSON Payload Parameters of Object.Yml

To construct the JSON payload of each object.yml entry, the API converter read's each key in the operations dictionaries and reads the parameter content for each method from the staging_object.yml.

In some embodiments, the API converter starts with building JSON payloads by reading swagger parameters section, and uses the following rules to create the JSON payloads:

1. If a star "*" is found in the parameter, the converter adds a UNIQUE tag based on its datatype. This may be used, for example, for actions associated with creating a new object instance.
   a. If the datatype is string: The default parameter will be "Str_UNIQUE_255". Although the string length in this example has a max length of 255, other value string lengths may be used depending on the embodiment.
   b. Else if the datatype is an integer: The default parameter will be "Int_UNIQUE_4096". Although the max integer length in this example is 4096, other max integer length may be used depending on the embodiment.
2. If the parameter "id*" is found in the parameter, or a URI or a Description is found, the converter code adds an AUTOFILL tag, and the respective operation used to collect the id. This may be used, for example, for modify and other actions.
   a. The converter reads the operation needed for the id by parsing the description 410. Based on the description, the converter determines the type of parameters that should be required.

Examples may include:
- Identifier of the NAS Server instance,
- Object ID of the NAS server for the filesystem,
- Unique identifier of the NAS server to which the network interface belongs, as defined by the nasServer resource type.

In each of these three examples, the nas-server id had to be provided, for instance as a POST payload. Based on the above logic operations(keyword): (parameters, with UNIQUE & AUTOFILL tags are added where it is applicable) dictionary for each object OPERATION is built and added under the JSON payload key in the object.yml.

Building the VALIDATION Aspects of Object.Yml

The API converter 215 also builds the VALIDATION section of the object.yml. In some embodiments, the API converter reads the response code of operations and stores the required response code against each operation. This is a first level of the validation.

The following logic is used to create the VALIDATION aspects of the object.yml. As shown below, the type of validation required after execution of the operation is based on the type of operation that was supposed to have occurred. In some embodiments, this is based on the OPERATION parameter of the associated key/value pair in the object.yml:

If (OPERATION='create'):
List all objects
Validate the "id" of the newly created object.
elif(OPERATION='modify'):
List objects for attributes→through object ID
Check modified values/flags are reflecting in the system
elif(OPERATION='Delete):
List all objects and check that the "id" of the object does not exists in the system.

Based on this logic, operations(keyword):({Response code:value, operation:<operation name>, verify:<Verification>) dictionary for each operation of an object is built and added to the object.yml file.

FIG. 10 shows a sample snippet of an object.yml file, using an entry for "nas_server_create" as an example. FIG. 10 shows the OPERATION 1000, JSON payloads 1010, and VALIDATE 1020 portions of the example entry of the object.yml file.

In summary, the API convertor 215 creates entries of object.yml from corresponding entries of the staging_object.yml. The entries of object.yml are structured, such that each entry has an OPERATION, JSON payload, and VALIDATION portion.

Once the API converter has built the object.yml files, the API converter replaces the respective staging_object.yml files with the object.yml files in root.yml. This object.yml data structure is used to build the required REST End point and its payload for the operation received from "test script" and, post execution, validation is done based on the information under VALIDATION section.

Intelligent API Builder (Obiect.Yml→REST API)

Once the object.yml has been created, the intelligent API builder 220 uses the object.yml of the root.yml file to create a REST API for the system under test. In some embodiments, when a test script invokes an object and its OPERATION, the API builder accesses the "root.yml", fetches the object from list of keys, and loads its corresponding value object.yml. The intelligent API builder then extract the URI & JSON payload for the given OPERATION from corresponding object.yml. In some embodiments, the intelligent API builder follows the following flow model set forth below in Table II to create the REST API for the system under test:

TABLE II

If (object in object.keys( ) in root.yml):
  Load(object.yml)
  If (operation in operations.Key( ) in object.yml):
    Load (REST Method and URI) and build REST End Point of an operation
    Load (JSON value of operation) from JSON payload section # To Build Payload
    If "Str_UNIQUE_255" found in value:
      Generate Random name of 1 to 255 characters and assign the name to the key
    elif "Int_UNIQUE_4096" found in value:
      Generate Random number from 4096 to max supported and assign the name to the key
    elif "AUTOFILL" found in value:
      Execute the object & operations specified in the same JSON dictionary value and fetch the id. Then replace the id with the value of the particular key in the payload.

Table III contains an example showing an instance of create nas_server. In this example create nas_server requires a "node id" which needs to be fetched from the system. Hence, "node list' operation is executed, and node id is assigned to the "PrimaryNode" key.

TABLE III

"primaryNode":
{
  "AUTOFILL":"TRUE",
  "object":"node",
  "operation":"list",
  "output":"id"
}
  else:
    Send the payload without any modifications
else
  object not found - Fail the test Accordingly, the REST end point and its payload are generated for the operation requested by the "test script". This will be passed to the API Execution and Validation module.

API Execution and Validation (REST API→Result)

Once the REST API has been built by the intelligent API builder, the REST API is able to be tested using API execution and validation subsystem 225. The constructed REST API endpoint and JSON payload are executed on the system under test (e.g. on system application 205) by API execution and validation subsystem 225. Output from the execution is passed and validated by the validation module of" the API execution and validation subsystem 225, based on the validation methods specified in the object.yml under VALIDATIONS section. Table IV shows an example from "nas_server.yml"

TABLE IV

```
validation:
  create:
    {
      "response":"200"  ,
      "operation":"nas_server,list",
      "verify":"id"
    }
```

As a first level of validation, the REST return code is validated. As a second level of validation the operation is executed, and the API execution and validation module 225 determines if the id captured during "nas_server_create" and the id fetched from nas_server list match. This enables the API execution and validation subsystem 225 to ascertain that the "nas server" that was supposed to be created has been created and exists in the system under test. Table V shows an example two level validation process:

TABLE V

```
1st level of validation:
    If (REST Return code == 200):
        1st level validation is Pass
    else:
        Fail
        exit (1)
2nd level of validation:
    If (id captured during nas_server create) == (id from nas_server list):
        Pass
        return (0)
    else:
        Fail
        return (1)
If "Test script" receives "return 0" then the Test is marked as "Pass" otherwise
it is marked as "Fail"
```

Notably, the process described above and shown in FIG. 2 does not require manual creation of any libraries/modules/classes to achieve test automation.

Solution in Action

The solution was used to automate testing of a Dell™ PowerMax™ system application referred to herein as "FILE" while that system application was being developed for an upcoming PowerMax platform, to achieve rapid test automation and to achieve left shift of product quality. Specifically, using this process, it was possible to initiate test automation while the REST API of the FILE system application was still in development, to thereby enable the tests to help accelerate the development process.

PowerMax FILE REST API support started with an eSM (Embedded System Management) specification, where test automation scripts were developed using the above-described process based on the API specification. Subsequently, the FILE product was migrated to a U4P infrastructure. This migration was transparent to the existing test automation scripts, thus showing that the test automation is able to be platform agnostic.

High Level Implementation Details

The FILE system application has several objects such as nasServer, filesystem, nfsServer, snapshots, replication, etc. In the following description, the "NasServer" object will be used as an example to explain the solution.

Initially, the API reader 210 processed the REST API content from a swagger page and constructed root.yml (indexing) and staging_object.yml (unstructured data of an object). FIG. 11 shows an example code snippet for Swagger API Reader (API Specification→root.yml, staging_object.yml).

The staging_object.yml was then input to the Intelligent API converter module 215. The API converter 215 transformed the staging_object.yml to object.yml with the structure shown in FIGS. 8 and 10. In FIGS. 8 and 10, the OPERATIONS portion contains the operation name, it's REST method and a corresponding URI. The JSON payload portion contains the payload details of the particular operation. The VALIDATION portion contains information about how validation needs to be performed for an operation. It specifies what operations need to be performed and what values need to be compared. FIG. 12 is a code snippet used by the intelligent API converter to create object.yml from staging_object.yml, according to some embodiments.

FIG. 13 shows an example snippet of the code used by the API builder to create a REST API endpoint. When a test script invokes an object and its operation, the API builder refers to the "root.yml" data structure. The API builder fetches the object from a list of keys and loads its corresponding value object.yml. The API builder extracts the URI & JSON payload for the given OPERATION from corresponding object.yml.

The constructed REST API endpoint and JSON payload are executed on system under test by the API execution and API validation module. Output from the execution module is passed to and validated by the validation module based on the validation methods specified in the object.yml under VALIDATION section. FIG. 14 shows an example portion of the code of the execution module to execute operations on the constructed REST API for the system under test. FIG. 15 shows an example portion of the corresponding code of the validation module to verify that the system under test executed the correct operation as expected.

The process shown in connection with FIGS. 11-15 was iterated with all of the PowerMax FILE system application functions, such as FileSystem and Snapshot automation, and its validation was achieved. Hence separate code blocks of libraries for each object were not required to achieve Test Automation in connection with development of the FILE system application 205.

Sample Test Case Automation

An example test case shown below in Table V was automated using this model. FIG. 16 shows the test case script for the test case shown in Table V.

TABLE V 1. create nas server name=kumar_test220 primarynode=1 backupnode=2
2. create file interface on nas server name=kumar_test220 using ip=10.228.207.130
3.   create nfs server hostName=nfs_server_test216_1 on nas server name=kumar_test216
4.  create file system filesystem_name=kumar_file_1 size=50000 on nas_server server_name=nas_server1
5. create nfs export on filesystem=file1_test216 nfs_name=share_file1_test216_1
6. modify filesystem filesystem_name=file1_test216 with description=New_Modified_1 size=10000
7. modify filesystem filesystem_name=file1_test216 with size=100000
8. List all the filesystem
9. Delete all the filesystem As discussed in greater detail above, this approach to implementing test automation has numerous benefits over the previous method of creating custom libraries for each version of a product during the product development cycle. One benefit of this approach is that it is platform agnostic. For example, as noted above, it is possible to create a REST API based on the API specification when a file is being implemented using a first infrastructure, such as eSM, use the same REST API to implement testing of the system under test after migration of the product to a second infrastructure, such as U4P.

The effort to start test automation is also minimal, since the entire process of building the required constructs is done in an automated manner directly from the API specification. This enables test automation to occur early in the development process, for example while the REST API is still being developed, since any time the API specification changes, it is possible to simply and automatically re-run the process to generate a new test automation environment. Likewise, any time a product changes, it is possible to easily create a new test automation environment for the changed API, which greatly reduces maintenance effort associated with implementing the automated tests. Further, the solution can be shipped with the storage system, since it is very lightweight. This helps with running acceptance testing before moving a storage system into production at the customer environment.

Existing Solution Study

The described solution was compared against several different automation solutions that are available in the industry. Several of the example automation solutions are:
Linear Automation Framework
Modular Based Testing Framework
Library Architecture Testing Framework
Data-Driven Framework
Keyword-Driven Framework
Hybrid Test Automation Framework Each of these frameworks has its own advantages and solves different problems associated with test automation. However, in all cases the test automation libraries/modules of all the product functionalities must be developed either as a separate module or within the test script. Hence the library/module is tightly coupled with a platform/product, and can't be leveraged across products and platforms.

By contrast, the solution described herein is unique, in that it is able to be leveraged across platforms and products. No separate test library is required to be created to achieve the automation, and hence there is less maintenance when the product API changes. Further, this enables test automation to be implemented during product development, rather than waiting until the REST API has been finalized.

Table VI shows a comparison of the amount of time spent in different automation activities between the traditional approach and the proposed approach. This is based on historical data across multiple teams.

TABLE VI

| | Traditional automation model | Proposed model | Justification |
| --- | --- | --- | --- |
| Time to complete library development (20 objects) | 3-6 months | 1 day | API reader and API converter convert all into config files |
| Effort for any product API spec changes | 1-2 weeks per API change | 1 day | Re-process API spec into API reader |
| Moving into new REST API implementation model | 2 months | 1 week | Benchmarked based on eSM to U4V conversion for PowerMax FILE system application |
| Portability to any REST API product | No | Yes | Proposed solution works as long as any product follows any standard API implementation |

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of automating creation of test scripts to test functionality of a system application comprising:
   reading a Representational State Transfer (REST) Application Programming Interface (API) specification file of the system application;
     using the REST API specification file to create a root.yml file containing key:value pairs, in which each key is an object from the REST API specification and each value is a staging_object.yml file, each staging_object.yml file having a plurality of staging_object.yml entries, each staging_object.yml entry containing a REST method, a REST end point, and a description of an operation associated with the entry;
     converting the staging_object.yml files into object.yml files, each object.yml file having a plurality of object.yml entries corresponding to respective staging_object.yml entries, each object.yml containing an OPERATION parameter containing a REST method and Uniform Resource Identifier (URI), a JavaScript Object Notation (JSON) payload parameter, and a VALIDATION parameter;
     using the object.yml files to create a REST API for the system application, the REST API including a plurality of REST endpoints corresponding to the object.yml entries;
     executing a series of test operations on the REST API that has been created for the system application, each test operation specifying a respective REST API endpoint and JSON payload, to test functions of the system application;
     receiving responses to the series of test operations from the system application;
   and validating the responses to determine execution of the system application;
   wherein the step of using the object.yml files to create the REST API for the system application comprises, for each object.yml entry:
     selecting an object.yml entry, the object.yml entry having the OPERATION parameter containing the REST method and Uniform Resource Identifier (URI), the JSON payload parameter, and the VALIDATION parameter;
     using the REST method and URI to build a REST end point corresponding to the selected object.yml entry; and
     using a value from the JSON payload parameter to build a payload corresponding to the selected object.yml entry.

2. The method of claim 1, wherein each staging_object.yml file is an unstructured file corresponding to a respective object of API specification.

3. The method of claim 1, wherein the description of a given staging_object.yml entry contains parameters describing instances required by the entry.

4. The method of claim 1, wherein the OPERATION parameter of a given object.yml entry is based on a REST method of a corresponding staging_object.yml entry.

5. The method of claim 1, wherein the OPERATION parameter of a given object.yml entry includes an operation method and a corresponding Uniform Resource Identifier (URI).

6. The method of claim 1, wherein the JSON payload parameter of a given object.yml entry is based on a parameter content of a corresponding staging_object.yml entry.

7. The method of claim 6, wherein when the parameter of the corresponding staging_object.yml entry requires a unique value, a UNIQUE tag is added to the JSON payload based on a datatype of the parameter requiring the unique value.

8. The method of claim 7, wherein the UNIQUE tag is either a unique string or a unique integer depending on the datatype of the parameter requiring the unique value.

9. The method of claim 6, wherein when the parameter of the corresponding staging_object.yml entry requires an ID parameter, an AUTOFILL tag is added to the JSON payload.

10. The method of claim 1, wherein the VALIDATION parameter of a given object.yml entry is based on a description of the corresponding staging_object.yml entry.

11. The method of claim 10, wherein the VALIDATION parameter is based on a type of action that is supposed to occur when the OPERATION associated with the object.yml entry is implemented on the system application.

12. The method of claim 1, wherein when the value from the JSON payload parameter is a UNIQUE tag, the method further comprises generating a random number and including the random number in the payload corresponding to the selected object.yml entry.

13. The method of claim 1, wherein the step of using the REST API as the test environment for the system application comprises:
   obtaining a script containing a set of operations describing a test use case scenario to be executed on the system application;
   issuing the set of operations on the REST API to the system application; and executing the set of operations by the system application.

14. The method of claim 13, further comprising using the VALIDATION parameters of the object.yml to validate whether the set of operations of the test use case scenario were properly executed on the system application.

* * * * *